(12) United States Patent
Tong et al.

(10) Patent No.: US 10,122,424 B2
(45) Date of Patent: Nov. 6, 2018

(54) MOBILE COMMUNICATION SYSTEM, BASE STATION, AND USER TERMINAL

(71) Applicant: KYOCERA CORPORATION, Kyoto (JP)

(72) Inventors: Fangwei Tong, Machida (JP); Atsuhisa Inakoshi, Yokohama (JP); Kugo Morita, Higashiomi (JP); Masato Fujishiro, Yokohama (JP); Chiharu Yamazaki, Tokyo (JP); Akinori Iwabuchi, Machida (JP); Tohru Sunaga, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/564,444

(22) PCT Filed: Apr. 7, 2016

(86) PCT No.: PCT/JP2016/061464
§ 371 (c)(1),
(2) Date: Oct. 5, 2017

(87) PCT Pub. No.: WO2016/163490
PCT Pub. Date: Oct. 13, 2016

(65) Prior Publication Data
US 2018/0076856 A1    Mar. 15, 2018

Related U.S. Application Data

(60) Provisional application No. 62/145,726, filed on Apr. 10, 2015.

(51) Int. Cl.
*H04B 7/06* (2006.01)
*H04W 72/04* (2009.01)
(Continued)

(52) U.S. Cl.
CPC ......... *H04B 7/0408* (2013.01); *H04B 7/0456* (2013.01); *H04B 7/0632* (2013.01);
(Continued)

(58) Field of Classification Search
CPC .. H04B 7/0408; H04B 7/0632; H04B 7/0456; H04B 17/12; H04B 17/14; H04W 16/28;
(Continued)

(56) References Cited

U.S. PATENT DOCUMENTS 9,853,707 B2 * 12/2017 Yu ........................ H04B 7/0626
9,906,284 B2 *  2/2018 Zhong .................. H04B 7/0413
(Continued)

FOREIGN PATENT DOCUMENTS

JP    2007-525119 A    8/2007
JP    2012-186566 A    9/2012
(Continued)

OTHER PUBLICATIONS

International Search Report issued in PCT/JP2016/061464; dated Jun. 28, 2016.
(Continued)

*Primary Examiner* — Andrew Wendell
(74) *Attorney, Agent, or Firm* — Studebaker & Brackett PC

(57) ABSTRACT

A mobile communication system is a mobile communication system that performs communication between a base station and a user terminal. When a directivity is formed to transmit a radio signal, the base station transmits a first radio signal including identification information to identify the formed directivity and a reference signal. The user terminal receives the first radio signal and transmits a second radio signal including quality information when receiving the reference signal and the identification information. The base station receives the second radio signal and determines the direc-
(Continued)

tivity to be formed based on the identification information and the quality information.

9 Claims, 12 Drawing Sheets

(51) Int. Cl.
  *H04B 7/0408* (2017.01)
  *H04W 16/28* (2009.01)
  *H04B 7/0456* (2017.01)
  *H04L 5/00* (2006.01)
(52) U.S. Cl.
  CPC ......... *H04B 7/0695* (2013.01); *H04L 5/0048* (2013.01); *H04L 5/0057* (2013.01); *H04W 16/28* (2013.01); *H04W 72/046* (2013.01); *H04W 72/0426* (2013.01)
(58) Field of Classification Search
  CPC .. H04W 72/0426; H04W 24/02; H04L 5/0057
  See application file for complete search history.

(56) References Cited

U.S. PATENT DOCUMENTS

| 2005/0200524 | A1 | 9/2005 | Grandhi et al. | |
| 2006/0056462 | A1* | 3/2006 | Miyoshi | H04B 7/0408 370/504 |
| 2006/0094468 | A1* | 5/2006 | Hoshino | H04B 7/0604 455/561 |
| 2011/0294496 | A1* | 12/2011 | Hirakawa | H04W 12/06 455/422.1 |
| 2012/0190396 | A1* | 7/2012 | Oyama | H04W 16/28 455/517 |
| 2012/0224542 | A1 | 9/2012 | Inohiza | |
| 2013/0102345 | A1* | 4/2013 | Jung | H04B 7/0456 455/513 |
| 2014/0177607 | A1* | 6/2014 | Li | H04B 7/0617 370/336 |
| 2014/0254539 | A1* | 9/2014 | Nagata | H04L 5/0051 370/329 |
| 2014/0321563 | A1* | 10/2014 | Park | H04L 25/03898 375/260 |
| 2015/0241556 | A1* | 8/2015 | Aoki | G01S 7/4008 342/26 R |
| 2015/0333884 | A1* | 11/2015 | Athley | H04L 5/0048 375/295 |
| 2016/0205633 | A1 | 7/2016 | Mizusawa | |
| 2016/0380734 | A1* | 12/2016 | Wang | H04L 5/0057 370/329 |
| 2017/0325057 | A1* | 11/2017 | Zhang | H04W 4/02 |

FOREIGN PATENT DOCUMENTS

| JP | 2014-150388 A | 8/2014 |
| WO | 2013/094980 A1 | 6/2013 |
| WO | 2013/134128 A1 | 9/2013 |
| WO | 2013/165149 A1 | 11/2013 |
| WO | 2015/045659 A1 | 4/2015 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.5.0; Mar. 2015; pp. 1-251; Release 12; 3GPP Organizational Partners.

Kyocera; Dynamic Beamformed CSI-RS for Elevation Beamforming/FD-MIMO; 3GPP TSG-RAN WG1 Meeting #80Bis; R1-151471; Apr. 20-24, 2015; pp. 1-2; Belgrade, Serbia.

* cited by examiner

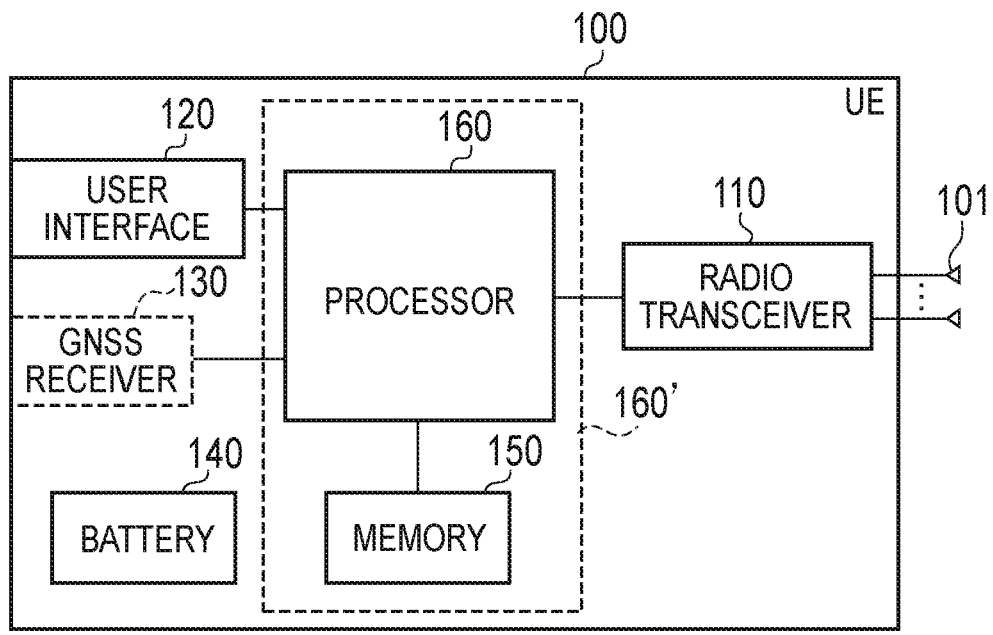
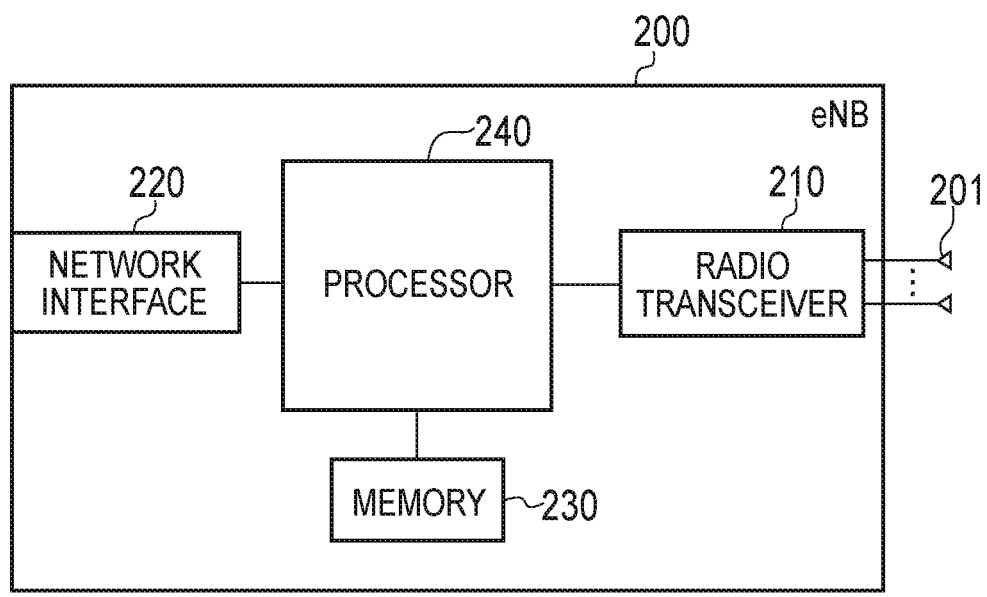

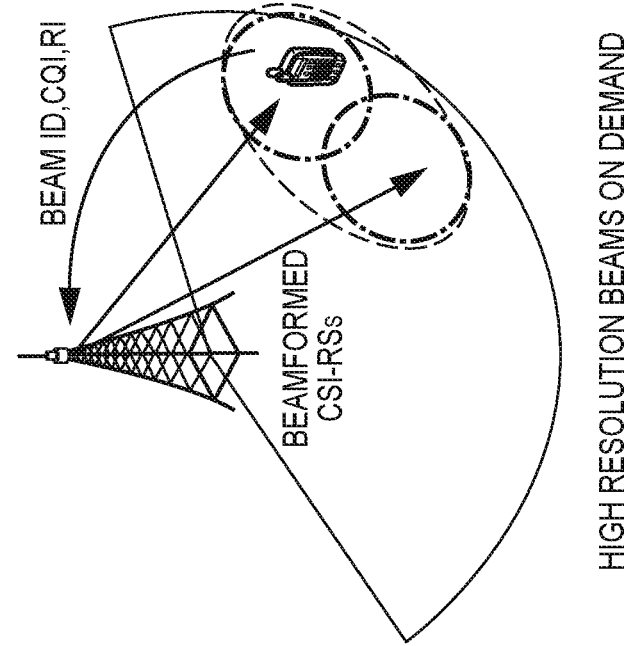
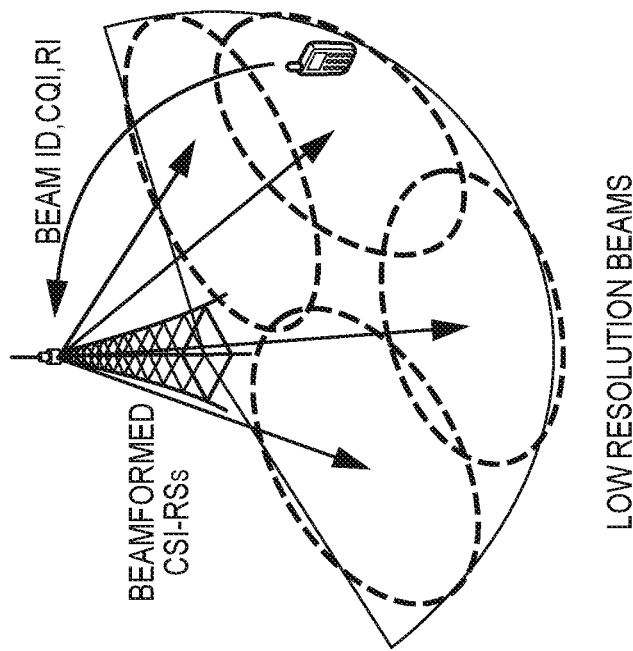

MOBILE COMMUNICATION SYSTEM, BASE STATION, AND USER TERMINAL

TECHNICAL FIELD

The present invention relates to a mobile communication system, a base station, and a user terminal that support multi-antenna transmission.

BACKGROUND ART

An LTE system of which the specifications are formulated in 3GPP (3rd Generation Partnership Project), which is a project aiming to standardize a mobile communication system, supports downlink multi-antenna transmission (for example, see Non Patent Literature 1).

Along with recent expansion in communication demand, effective use of radio resources becomes more and more important even in communication technologies including LTE. Under such circumstances, there is a request for higher communication quality such as communication stability.

CITATION LIST

Non Patent Literature

3GPP Technology Specifications "TS 36.300 V12.5.0" (March, 2015)

SUMMARY

A mobile communication system according to a first aspect is a mobile communication system that performs communication between a base station and a user terminal. When a directivity is formed to transmit a radio signal, the base station transmits a first radio signal including identification information to identify the formed directivity and a reference signal. The user terminal receives the first radio signal and transmits a second radio signal including quality information when receiving the reference signal and the identification information. The base station receives the second radio signal and determines the directivity to be formed based on the identification information and the quality information.

A mobile communication system according to a second aspect is a mobile communication system that performs communication between a base station and a user terminal. The base station transmits a first radio signal including a reference signal at a predetermined timing according to a formed directivity. The user terminal transmits a second radio signal including communication quality information when receiving the reference signal after a lapse of a predetermined period from the reception of the first radio signal. The base station receives the second radio signal and determines a directivity to be formed based on the timing at which the user terminal transmits the second radio signal and the quality information.

A base station according to a third aspect is a base station that performs communication with a user terminal. The base station comprises a transceiver configured to transmit and receive a radio signal; a formation unit configured to form a directivity of the radio signal to be transmitted by the transceiver; and a controller configured to determine the directivity to be formed by the formation unit. The transceiver transmits a radio signal including identification information to identify a directivity and a reference signal with the directivity formed by the formation unit, and receives a radio signal transmitted by the user terminal. The controller determines the directivity to be formed by the formation unit based on the identification information and quality information based on the reference signal transmitted by the base station which are included in the radio signal transmitted by the user terminal.

A user terminal according to a fourth aspect is a user terminal that performs communication with a base station. The user terminal comprises a transceiver configured to transmit and receive a radio signal; and a controller configured to calculates signal quality of a radio signal received by the transceiver. The transceiver receives a first radio signal transmitted by the base station. The controller calculates quality information based on communication quality when receiving a reference signal included in the first radio signal. The transceiver transmits a second radio signal including identification information included in the received first radio signal and the quality information.

BRIEF DESCRIPTION OF DRAWINGS

FIG. 2 is a block diagram of a UE according to the embodiments.

FIG. 3 is a block diagram of an eNB according to the embodiments.

FIGS. 17A and 17B are views illustrating a dynamic beamformed CSI-RS scheme according to the appendix.

DESCRIPTION OF EMBODIMENTS

Overview of the Embodiments

Figure 1:
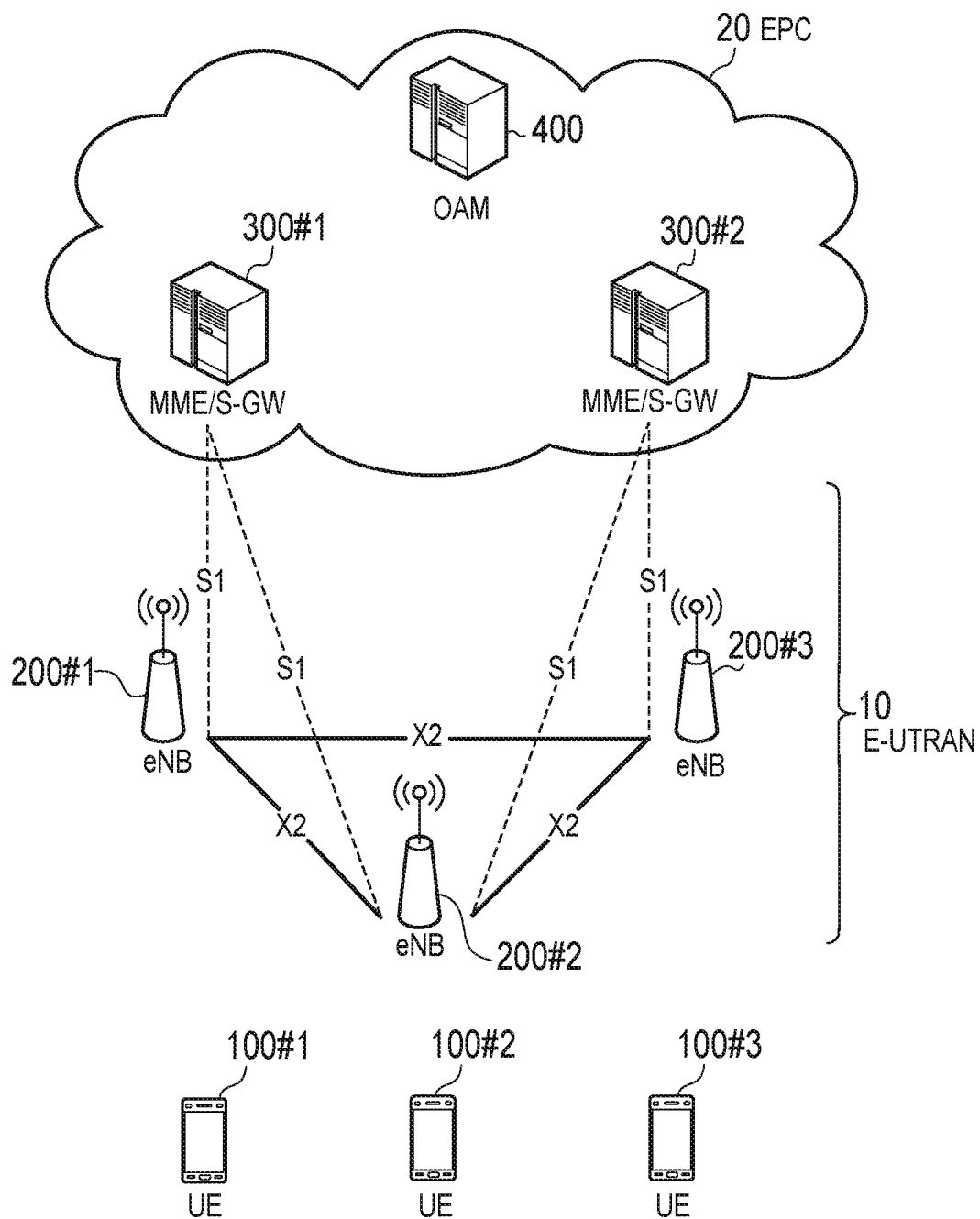
FIG. 1 is a configuration diagram of an LTE system according to the embodiments.

A mobile communication system according to one embodiment is a mobile communication system that performs communication between a base station and a user terminal. When a directivity is formed to transmit a radio signal, the base station transmits a first radio signal including identification information to identify the formed directivity and a reference signal. The user terminal receives the first radio signal and transmits a second radio signal including quality information when receiving the reference signal and the identification information. The base station receives the second radio signal and determines the directivity to be formed based on the identification information and the quality information.

In one embodiment, the base station has a plurality of antenna ports or antenna elements. The reference signal is transmitted in a predetermined resource block including a predetermined frequency unit and a predetermined period. The reference signal transmitted from each of the antenna ports or the antenna elements is orthogonally transmitted by making the frequency, time, code, etc. differently.

In one embodiment, the base station determines the directivity to be formed as a directivity with a higher resolution when quality indicated by the quality information is lower than predetermined quality.

In one embodiment, the base station detects mobility of the user terminal based on a radio signal received from the user terminal or information included in the radio signal, and determines a directivity wider than the directivity to be formed when the mobility indicates a predetermined movement amount per unit time or a movement amount greater than the predetermined movement amount.

In one embodiment, when the directivity to be formed is divided to a directivity with a predetermined directivity resolution, the base station determines the corresponding directivity.

In one embodiment, the base station transmits the reference signal even after determining the directivity to be formed that is used for data transmission.

In one embodiment, the base station stops transmission of the reference signal after determining the directivity to be formed.

In one embodiment, the base station has a plurality of antenna ports. The base station and the user terminal have a common codebook defining a weight when performing weighting on a signal for each of the antenna ports. When the directivity becomes narrower than a predetermined directivity, the base station performs weighting according to the codebook for each of the antenna ports. The user terminal transmits a signal including information of a specific precoding matrix selected from the codebook based on a signal obtained when receiving the reference signal. The base station receives the signal transmitted from the user terminal and determines weighting for each of the antenna ports based on the precoding matrix included in the signal.

In one embodiment, the user terminal transmits the quality information and the identification information to the base station for a single directivity or a plurality of directivities with relatively high communication quality.

A mobile communication system according to one embodiment is a mobile communication system that performs communication between a base station and a user terminal. The base station transmits a first radio signal including a reference signal at a predetermined timing according to a formed directivity. The user terminal transmits a second radio signal including communication quality information when receiving the reference signal after a lapse of a predetermined period from the reception of the first radio signal. The base station receives the second radio signal and determines a directivity to be formed based on the timing at which the user terminal transmits the second radio signal and the quality information.

A base station according to one embodiment is a base station that performs communication with a user terminal. The base station comprises a transceiver configured to transmit and receive a radio signal; a formation unit configured to form a directivity of the radio signal to be transmitted by the transceiver; and a controller configured to determine the directivity to be formed by the formation unit. The transceiver transmits a radio signal including identification information to identify a directivity and a reference signal with the directivity formed by the formation unit, and receives a radio signal transmitted by the user terminal. The controller determines the directivity to be formed by the formation unit based on the identification information and quality information based on the reference signal transmitted by the base station which are included in the radio signal transmitted by the user terminal.

A user terminal according to one embodiment is a user terminal that performs communication with a base station. The user terminal comprises a transceiver configured to transmit and receive a radio signal; and a controller configured to calculates signal quality of a radio signal received by the transceiver. The transceiver receives a first radio signal transmitted by the base station. The controller calculates quality information based on communication quality when receiving a reference signal included in the first radio signal. The transceiver transmits a second radio signal including identification information included in the received first radio signal and the quality information.

Embodiments

Hereinafter, an embodiment in which the present disclosure is applied to an LTE system will be described.

System Configuration

FIG. 1 is a configuration diagram of the LTE system according to the embodiment. As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a connected cell (a serving cell). The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resources management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The E-UTRAN 10 and the EPC 20 constitute a network (LTE network) of the LTE system. The EPC 20 includes MME (Mobility Management Entity)/S-GW (Serving-Gateway) 300 and an OAM (Operation and Maintenance) 400. The MME (network apparatus) performs different types of mobility control and the like for the UE 100. The S-GW performs transfer control of the user data. The MME/S-GW 300 is connected to the eNB 200 via an S1 interface.

The OAM 400 is a server apparatus managed by an operator, and performs maintenance and monitoring of the E-UTRAN 10.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 corresponds to storage and the processor 160 corresponds to a controller. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The antenna 101 may be composed of a plurality of antenna elements. The radio transceiver 110 may configure a directivity formation unit that forms directivity for transmission or reception using the antenna 101 consisting of a plurality of antenna elements.

The processor 160 may calculate and determine the directivity formed by the directivity formation unit.

The processor 160 may calculate the signal quality from a reference signal or the like included in a signal received by the radio transceiver 110.

The memory 150 may store the directivity and the signal quality calculated by the processor 160.

The memory 150 may store the timing at which the radio transceiver 110 has transmitted and received.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Further, the UE 100 may include various sensors capable of determining whether the UE itself is moving or stopped, such as a tilt sensor, an acceleration sensor, a gyro sensor, or the like.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The antenna 201 may be composed of a plurality of antenna elements. The radio transceiver 210 may configure a directivity formation unit that forms directivity for transmission or reception using the antenna 201 consisting of a plurality of antenna elements.

The processor 240 may calculate and determine the directivity formed by the directivity formation unit.

The processor 240 may calculate the signal quality from a reference signal or the like included in a signal received by the radio transceiver 110.

The memory 230 may store the directivity and the signal quality calculated by the processor 240.

The memory 230 may store the timing at which the radio transceiver 210 has transmitted and received.

The network interface 220 is connected to the neighboring eNB 200 via the X2 interface, and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Further, the memory 230 may store, as a UE-ID list, identifiers of UEs with configuration of extension DRX and located in the cell managed by the eNB 200. The UE-ID list may include one or a plurality of UE identifiers.

Figure 4:
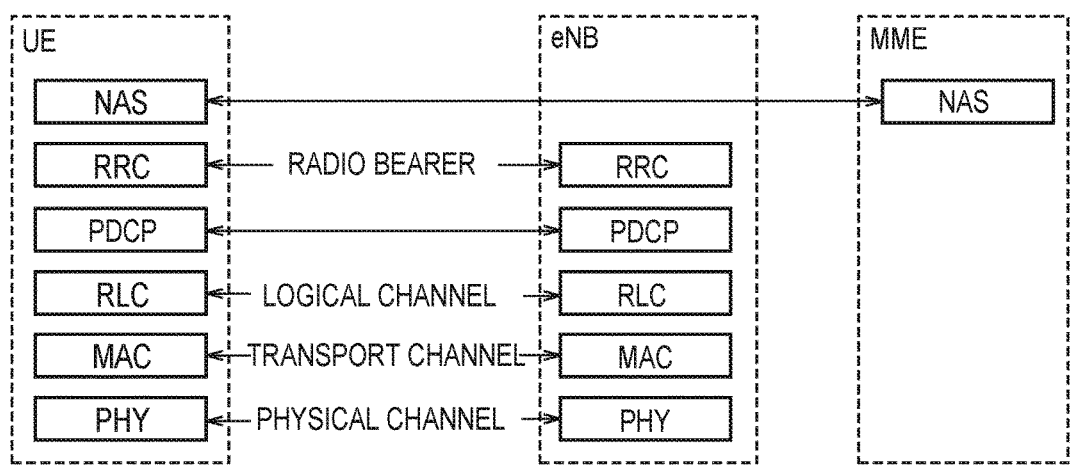
FIG. 4 is a protocol stack diagram according to the embodiments.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, and a retransmission process by a hybrid ARQ (HARQ), and the like. Between the MAC layer of the UE 100 and the MAC layer of the eNB 200, user data and control signals are transmitted via a transport channel. The MAC layer of the eNB 200 includes a scheduler for determining (scheduling) a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected mode (connected mode). Otherwise, the UE 100 is in an RRC idle state (idle mode).

An NAS (Non-Access Stratum) layer positioned above the RRC layer performs session management, mobility management and the like. The RRC layer, the PDCP layer, the RLC layer, the MAC layer, and the PHY layer are collectively referred to as an AS (Access Stratum) layer.

Figure 5:
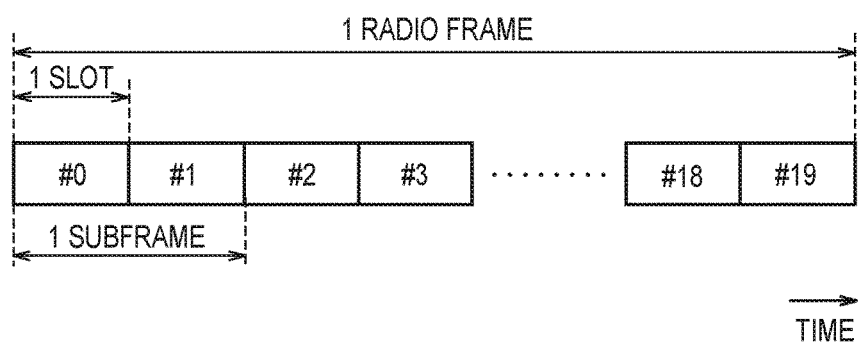
FIG. 5 is a configuration diagram of a radio frame according to the embodiments.

FIG. 5 is a configuration diagram of a radio frame used in the LTE system. In the LTE system, OFDMA (Orthogonal Frequency Division Multiplexing Access) is applied to a downlink (DL), and SC-FDMA (Single Carrier Frequency Division Multiple Access) is applied to an uplink (UL), respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RB: Resource Block) in a frequency direction (not shown), and a plurality of symbols in the time direction. Each resource block includes a plurality of subcarriers in the frequency direction. One symbol and one subcarrier forms one resource element. Here, the subcarrier may be regarded as a unit of frequency. Of the radio resources (time and frequency resources) assigned to the UE 100, a frequency resource can be configured by a resource block and a time resource can be configured by a subframe (or a slot).

Figure 6:
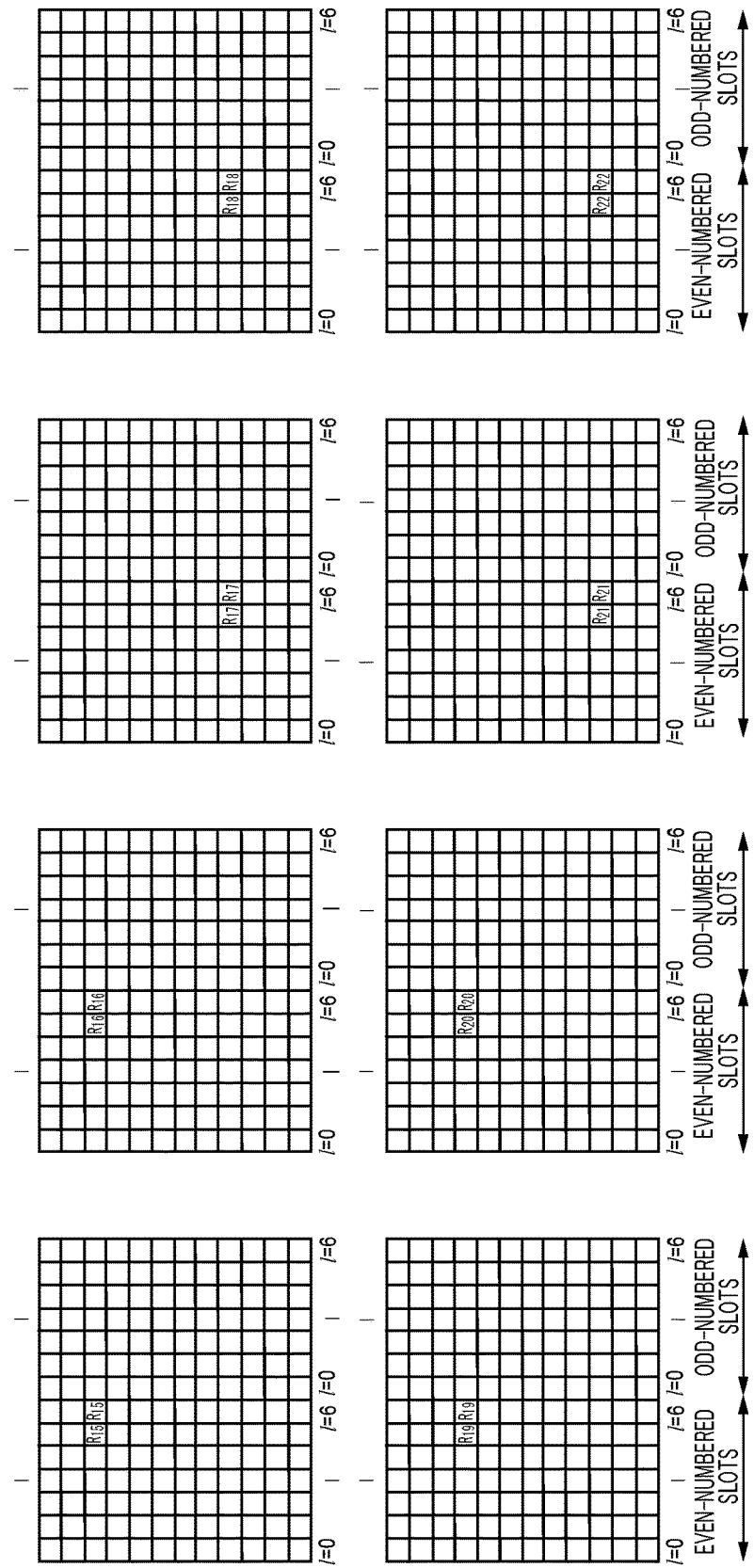
FIG. 6 is a view illustrating mapping of a reference signal according to the embodiments.

FIG. 6 is a view illustrating mapping in slots of Channel State Information Reference Signals (CSI-RS) as one of reference signals in an LTE system. Incidentally, the CSI of LTE communication is at least one of a Channel Quality Indicator (CQI), a Precoder Matrix Indicator (PMI), and a Rank Indicator (RI).

Each of reference signals (CSI-RS) from R15 to R22 is allocated to each antenna port and transmitted from an eNB 200.

Each reference signal is transmitted so as to be orthogonal in terms of time, a frequency, or a code. For example, R15 and R16 of CSI-RS are transmitted to be the same in terms of time and the frequency but to be orthogonal in terms of the code.

Operation According to Embodiment

Figure 7:
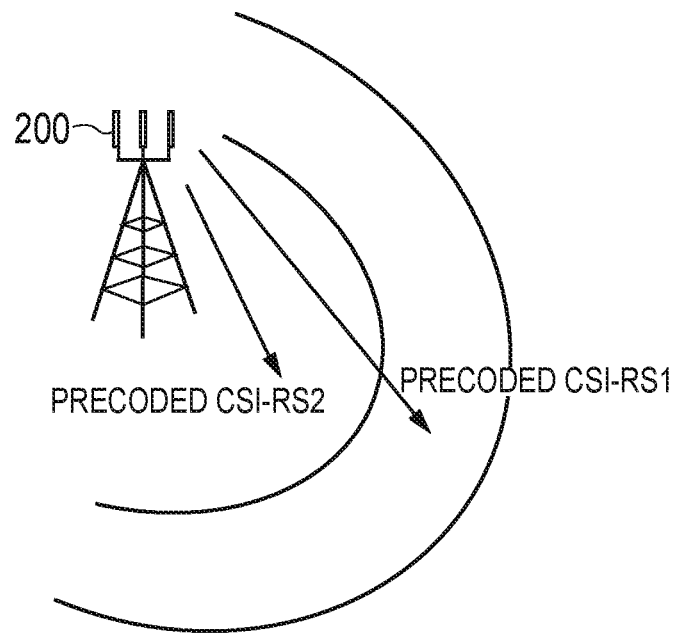
FIG. 7 is a view for describing an operation according to the embodiments.

Hereinafter, an operation according to the present embodiment will be described with reference to FIG. 7.

For the sake of convenience of description, processing in the vertical direction will be described as an example. The same processing is also performed in the horizontal direction. As illustrated in FIG. 7, the eNB 200 can form a plurality of ranges (coverage ranges) covering communication within an area or a cell by forming a plurality of directional beams covering a range of cells using a plurality of antenna elements or antenna ports. Incidentally, the example of FIG. 7 illustrates the coverage range obtained by forming a directivity in the vertical direction of an antenna directivity.

The eNB 200 can transmit the CSI-RS for each of the formed directional beams. The CSI-RS transmitted with the directivity formed in this manner will be referred to as precoded CSI-RS or beamformed CSI-RS, hereinafter. In addition, the CSI-RS transmitted with different directional beams will be referred to as a precoded CSI-RS1, a precoded CSI-RS2, . . . , a precoded CSI-RSx, . . . , and a precoded CSI-RSn, and these plurality of precoded CSI-RSs will be collectively referred to as precoded CSI-RSs.

Figure 8:
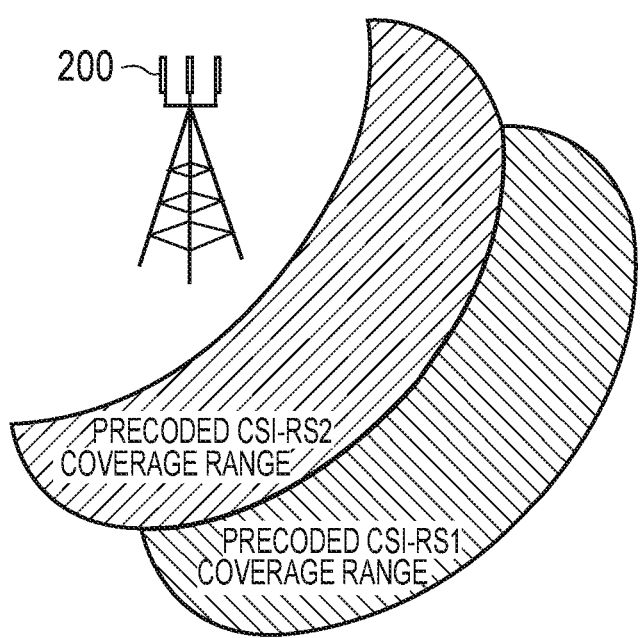
FIG. 8 is a view for describing an operation according to the embodiments.

The coverage range covered by the directivity formed in this manner is illustrated in FIG. 8.

FIG. 8 illustrates a state where the CSI-RS transmitted with different directional beams covers cell ranges.

First Embodiment

Figure 9:
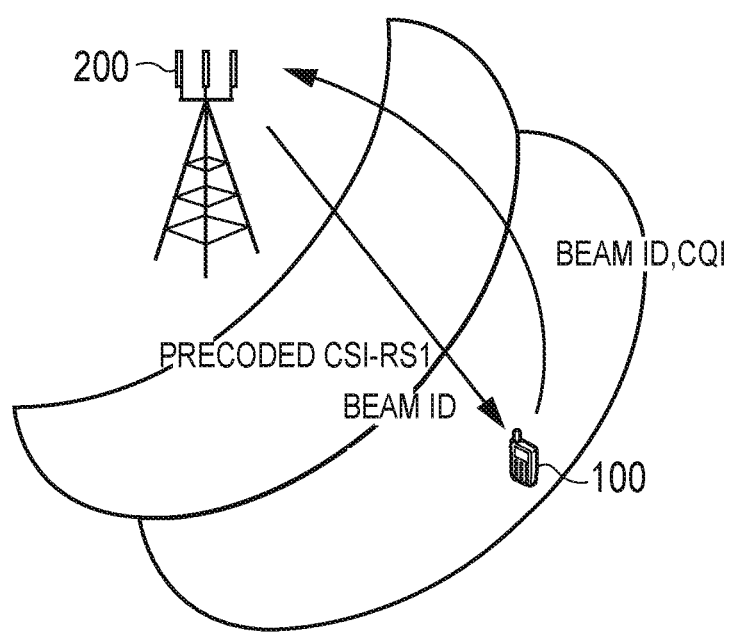
FIG. 9 is a view for describing an operation according to the first embodiment of the embodiments.

An operation according to a first embodiment will be described hereinafter. FIG. 9 is a view for describing the operation according to the first embodiment of the present embodiment.

The eNB 200 transmits a Beam Identification (beam ID) as directivity identification information, which is information for identifying this directivity and another directivity, together with the precoded CSI-RS for each coverage range. This beam ID corresponds to the directional beam. This beam ID is given by assigning different beam IDs for each directivity to be simultaneously transmitted from the eNB 200. Incidentally, the beam ID may be assigned again when a shape of the directivity is changed or when the number of the coverage ranges, covered by one directional beam, and/or the directional beams is changed by the directivity. In addition, a new beam ID may be assigned each time the directivity is changed.

A UE 100 calculates a CQI as quality information of a received channel based on the received precoded CSI-RS.

The UE 100 stores the received beam ID in a memory 150.

The UE 100 transmits (feeds back) information, such as the CQI and the beam ID, to the eNB 200. Incidentally, the information to be fed back may be PMI or RI other than the reception quality and the CQI. Alternatively, the information to be fed back may be channel state information (CSI) including these types of information.

Figure 10:
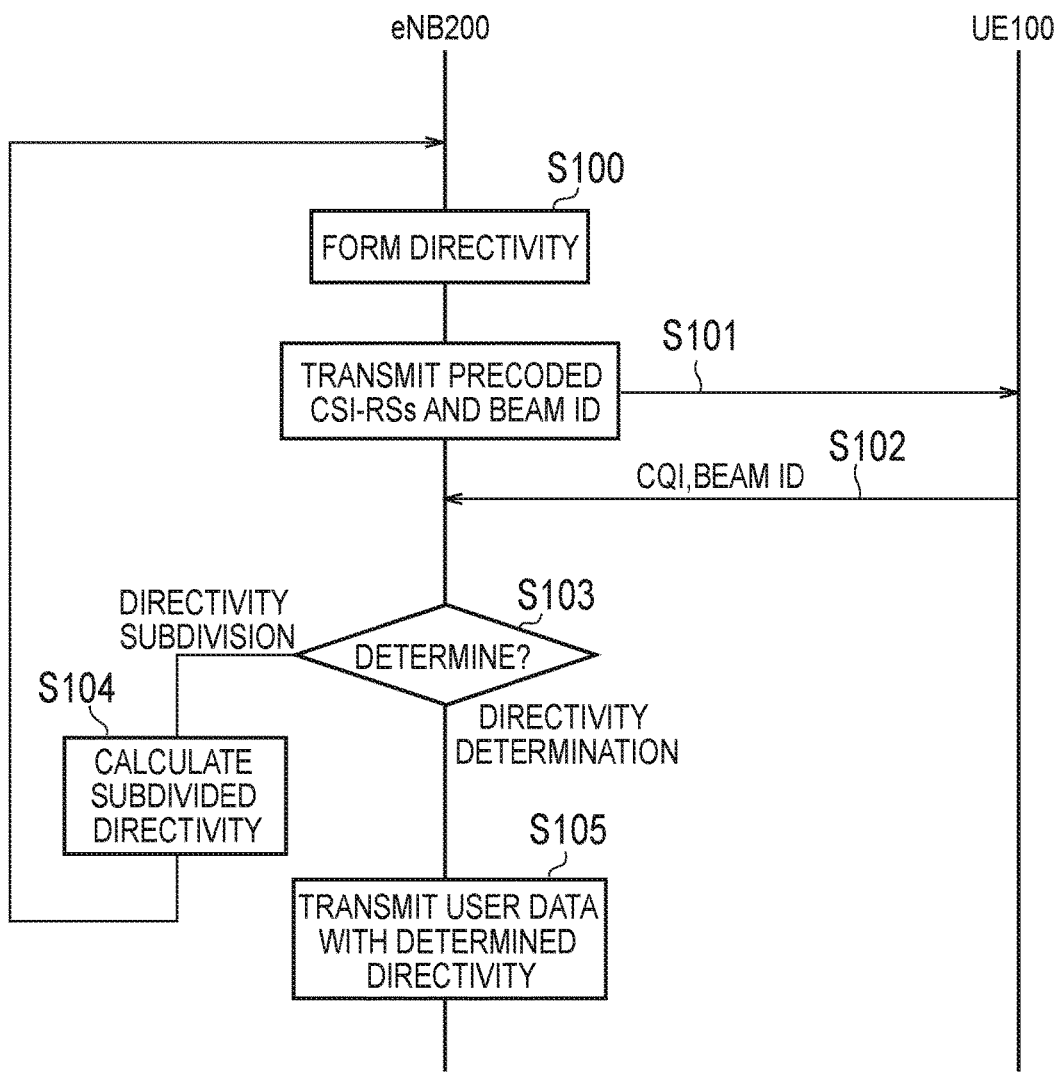
FIG. 10 is a view illustrating an operation sequence according to the first embodiment.

FIG. 10 is a view illustrating an operation sequence according to the first embodiment of the present embodiment.

In Step S100, the eNB 200 forms a directivity in a radio signal to be transmitted through a plurality of antennas 201 or antenna ports by a radio transceiver 210 including a transmission unit.

In Step S101, the eNB 200 transmits a precoded CSI-RS for each of coverage ranges covered by a plurality of directional beams. At this time, different beam IDs are transmitted for each directivity.

The UE 100 calculates a CQI using the received precoded CSI-RS and stores the calculated CQI in the memory 150. When having received a plurality of precoded CSI-RSs, the UE 100 may calculate CQIs corresponding to the respective CSI-RSs.

The UE 100 stores the beam ID corresponding to the received directional beam.

The UE 100 transmits the CQI and the beam ID stored in Step S102 to the eNB 200. At this time, the CQI and the beam ID for one of the received precoded CSI-RSs that has a good condition (for example, CQI value) may be transmitted. Alternatively, several CQIs and beam IDs in the descending order from one having a better condition among the received precoded CSI-RSs may be transmitted.

The eNB 200 receives the CQI and the beam ID transmitted by the UE 100.

In Step S103, a processor 240 of the eNB 200 determines whether to transmit the precoded CSI-RS with a further subdivided (narrowed) directivity or to transmit data using the current directional beam based on the received CQI and beam ID. For example, when the CQI indicates quality lower than predetermined quality, the eNB 200 determines to further subdivide the directivity. The eNB 200 determines to transmit data using a current directivity when the CQI indicates the predetermined quality or quality higher than the predetermined quality, or when it is difficult to perform further subdivision.

When the processor 240 determines to further subdivide the directivity in Step S103, the eNB 200 calculates the subdivided directivity in Step S104 and returns to Step S100. In addition, a precoding matrix (precoder) corresponding to a directional beam to be subdivided may be calculated and saved in advance, and the saved precoding matrix corresponding to the directional beam to be subdivided may be selected when it is determined to subdivide the directivity.

When the processor 240 determines to transmit data using the current directional beam in Step S103, the eNB 200 starts transmitting user data with the current directional beam in Step S105.

Incidentally, when information indicating a request for the further subdivision of the directivity or for higher communication quality is transmitted from the UE 100 in Step S102, the eNB 200 may determine to further subdivide the directivity even when the CQI indicates quality better than the predetermined quality in Step S103.

Incidentally, the eNB 200 may recognize mobility of the UE 100 based on information (speed or a position) on movement of the UE 100 (for example, GPS information of the UE 100, adjustment and change information of transmission power of the UE 100, or the like) and determine not to subdivide the directivity or to make the directivity wider. Alternatively, the eNB 200 may return to a state (initial state) before subdividing the directivity based on movement of the UE by a predetermined distance or the movement thereof at predetermined speed and determine whether to perform subdivision again.

Incidentally, the eNB 200 may subdivide or widen the directivity based on the amount of user data, a QoS request during communication, the capability of the eNB 200 to form the directivity, and the like.

Incidentally, the eNB 200 may re-determine the directivity according to a directivity selected by the UE (that is, the beam ID fed back from the UE 100) in Step S103.

Incidentally, the eNB 200 may select one of the plurality of CQIs transmitted from the UE 100 in Step S102 and form a directional beam corresponding to the selected CQI in Step S103.

Incidentally, a directivity may be determined once the directivity is subdivided a predetermined number of times in Step S103.

Incidentally, a directivity may be determined when a timing to transmit data has come in in Step S103.

Figure 11:
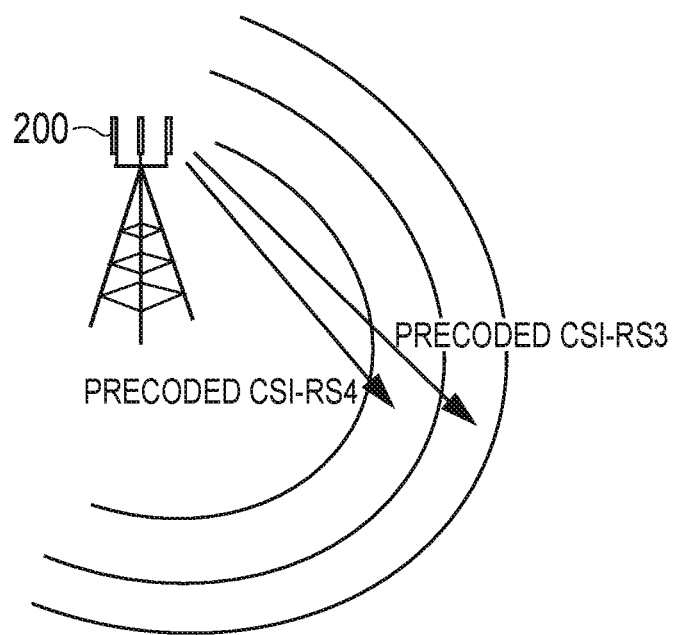
FIG. 11 is a view for describing an operation according to the first embodiment.

FIG. 11 is a view for describing the operation according to the first embodiment.

When the eNB 200 determines to further subdivide the directivity in Step S103 of FIG. 10, a directional beam to be subdivided is determined based on the CQI and the beam ID transmitted in Step S102.

For example, it is assumed that the UE 100 exists in the coverage range where the precoded CSI-RS1 is transmitted. Then, a CQI1 corresponding to precoded CSI-RS1 illustrated in FIG. 7 is considered to indicate higher quality as compared to the other coverage ranges, and the UE 100 feeds back the beam ID, the CQI, and the like corresponding to the precoded CSI-RS1 to the eNB 200.

In Step S103, the eNB 200 attempts to set a directivity gain to a higher value by subdividing the directivity of the CSI-RS1 to which the fed back beam ID corresponds. Accordingly, the transmission performance with respect to the corresponding UE 100 is improved, and at the same time, it is also expected that the UE 100 existing in the other coverage range is hardly interfered.

In FIG. 11, the eNB newly forms directional beams of precoded CSI-RS3 and precoded CSI-RS4 with a high resolution in this coverage range in order to further subdivide the coverage range of the selected precoded CSI-RS1.

Figure 12:
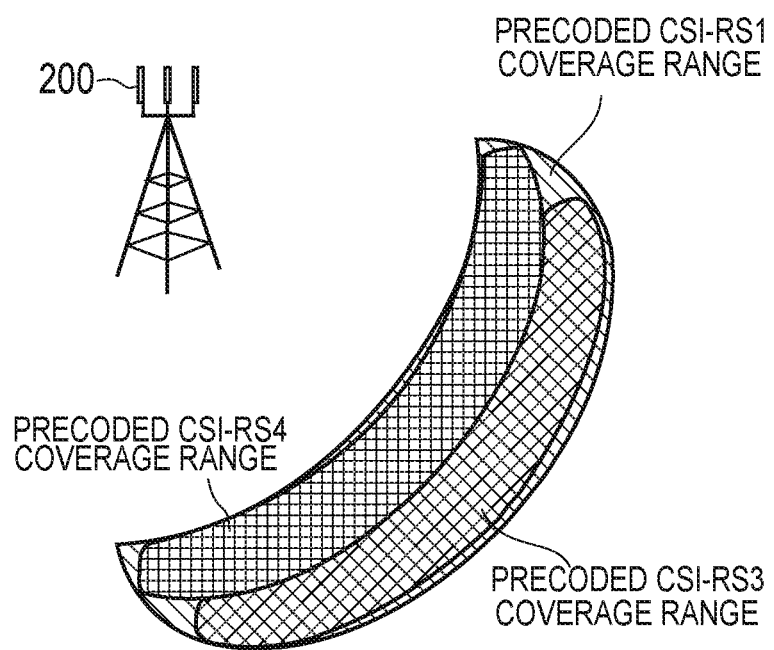
FIG. 12 is a view for describing an operation according to the first embodiment.

FIG. 12 illustrates a state where the eNB 200 divides the coverage range of the precoded CSI-RS1 into coverage ranges of the precoded CSI-RS3 and the precoded CSI-RS4.

Through the above-described operation, the eNB 200 subdivides the directivity until the CQI fed back from the UE 100 reaches a desired CQI or up to a limit in resolution of the directivity to be formed.

Incidentally, the eNB 200 may change the directivity according to the movement speed of the UE 100. For example, the directivity may be widened if the movement speed of the UE 100 is higher than the predetermined speed. Alternatively, the eNB 200 may return to the state (initial state) before subdividing the directivity based on movement of the UE by the predetermined distance or the movement thereof at the predetermined speed, and perform subdivision again.

Although the first embodiment has been described by exemplifying the processing in the vertical direction, but the same processing is also performed in the horizontal direction. In addition, the vertical direction and the horizontal direction may be processed simultaneously or sequentially.

Additional Operation Example 1

Figure 13:
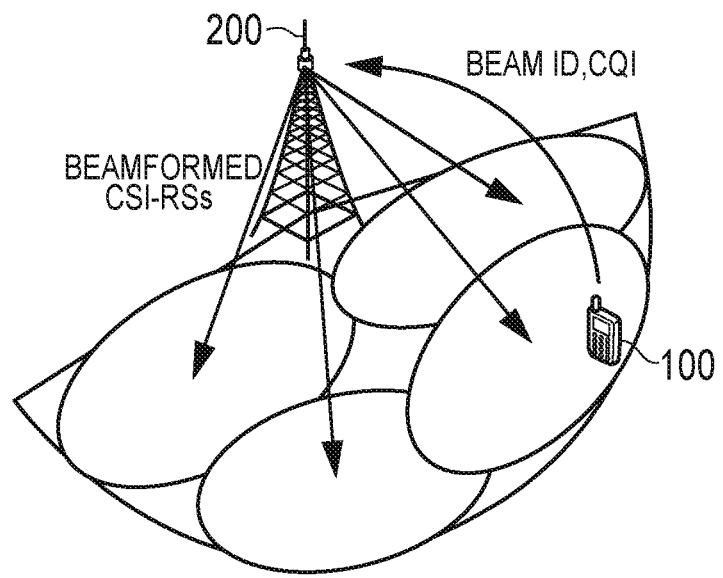
FIG. 13 is a view for describing an operation according to Additional Operation Example 1 of the first embodiment.
Figure 14:
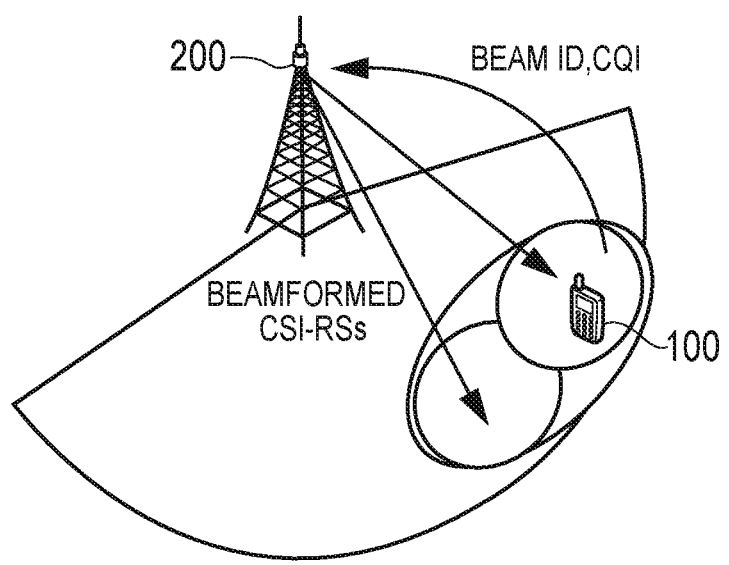
FIG. 14 is a view for describing an operation according to Additional Operation Example 1 of the first embodiment.

Additional Operation Example 1 of the first embodiment will be described with reference to FIGS. 13 and 14. FIGS. 13 and 14 are views for describing operations according to Additional Operation Example 1 of the first embodiment.

In FIG. 13, the radio transceiver 210 and the antenna 201 of the eNB 200 can be formed by varying the directivity over two dimensions. The respective dimensions of the two dimensions are, for example, a vertical direction and a horizontal direction with respect to an installation face of the eNB 200. It is possible to vary the coverage range in terms of a distance from the eNB 200, a direction, an area or the like by varying the directivity over these two dimensions. In particular, in FIG. 13, the eNB 200 forms the coverage range divided into the two dimensions by varying the directivity in the vertical direction to vary the distance of the coverage range from the eNB 200 and varying the directivity in the horizontal direction to vary the direction of the coverage range with respect to the eNB 200.

The eNB 200 transmits the CSI-RS and the corresponding beam ID for each of the plurality of formed directional beams such that the cell range can be covered.

The UE 100 calculates the CQI from the received precoded CSI-RS.

The UE 100 transmits a combination of the calculated CQI and the corresponding beam ID to the eNB 200.

The UE 100 may calculate each of the CQIs corresponding to the plurality of received precoded CSI-RSs, select an optimum CQI, and feed the selected CQI back to the eNB 200 in combination with the corresponding beam ID. In addition, each of the CQIs corresponding to the plurality of precoded CSI-RSs may be calculated, and a plurality of combinations of the beam IDs corresponding thereto may be transmitted to the eNB 200.

Through these operations, the eNB 200 can recognize the directional beam desired by the UE 100.

FIG. 14 illustrates an aspect in which the eNB 200 forms a plurality of further-subdivided directivities and transmits the CSI-RS and the corresponding beam ID for each directivity when the eNB 200 determines to form a further-subdivided directional beam (using the same determination method as in the first embodiment).

The UE 100 transmits the CQI calculated from the received precoded CSI-RS and the corresponding beam ID to the eNB 200.

Through these operations, the eNB 200 can recognize the directivity desired by the UE 100 among the more-subdivided directivities.

Incidentally, the process of varying the directivity in the vertical direction and the process of varying the directivity in the horizontal direction may be performed at the same time, or any dimension may be varied first, and then, the other dimension may be sequentially varied.

Incidentally, a frequency of variation of the directivity performed by the eNB 200 (a frequency of transmission of the precoded CSI-RS from the eNB 200 or transmission of the CQI or the like from the UE 100) may be set to be different for each dimension. For example, a frequency of the vertical direction may be lower than a frequency of the horizontal direction, or vice versa.

Incidentally, a periodicity or a periodicity of variation of the directivity performed by the eNB 200 may be set to be different for each dimension. For example, it may be configured such that the variation in the vertical direction is a periodic and the variation in the horizontal direction is periodic, or vice versa.

With the above-described operations, the eNB 200 can obtain the performance equivalent to that in the case of simultaneously using a large number of patterns, with a small number of precoded CSI-RS transmission patterns.

Incidentally, the precoded CSI-RS may be constantly transmitted regardless of the presence or absence of user data transmission. That is, the formation of directional patterns different only in the precoded CSI-RS is continuously attempted even after data transmission is started with a certain directional beam, and the data transmission is changed to a better directional beam if a better directional pattern is found.

Incidentally, the eNB 200 may be switched to subdivision using a codebook scheme instead of the subdivision using the precoded CSI-RS transmission at a stage where the directivity is subdivided to a certain degree. Here, the codebook scheme is a method of designating a directional pattern or a pattern of weighting to the antenna element, which has been agreed in advance between the eNB 200 and the UE 100, in the precoding matrix. A scheme adopted by LTE Rel-8 can be applied. In this scheme, the eNB 200 transmits a CRS (Cell-specific Reference Signal), and the UE 100 that has received the CRS calculates PMI and transmits the PMI to the eNB 200. With this operation, the eNB 200 can appropriately perform weighting on the antenna element or the antenna port.

Incidentally, the eNB 200 may form and transmit different directivities for each CSI-RS resource. At this time, when the CSI-RS is transmitted from different antenna ports by applying different types of precoding, reception power may be leveled using a plurality of CSI-RS resources per antenna port in 1 RB.

Incidentally, the eNB 200 may transmit a precoded CSI-RS obtained by dividing the directivity in the vertical direction and a precoded CSI-RS obtained by division in the horizontal direction and receive the CQI and the beam ID from the UE 100. Accordingly, the eNB 200 obtains the directivity desired by the UE 100 for each division direction. Further, an intersection direction where it is considered that the directivities of these division directions overlap with each other.

Next, the eNB 200 forms a sharp directivity near the intersection direction obtained as above, and transmits the precoded CSI RS. The eNB 200 learns a relationship between the intersection direction and the sharp directivity based on the CQI and the beam ID with which the UE 100 replies.

In this manner, the eNB 200 may be configured to find a direction of the UE 100 using the directivity divided in the vertical direction and the directivity divided in the horizontal direction.

Incidentally, a ratio to transmit the precoded CSI-RS with the sharp directivity may be controlled according to the number of UEs 100 in communication in such an operation. For example, it may be configured such that the sharp directivity may be reduced when the number of the UEs 100 in communication is large.

Incidentally, such an operation may be performed when the number of the UEs 100 in communication is small.

Additional Operation Example 2

Figure 15:
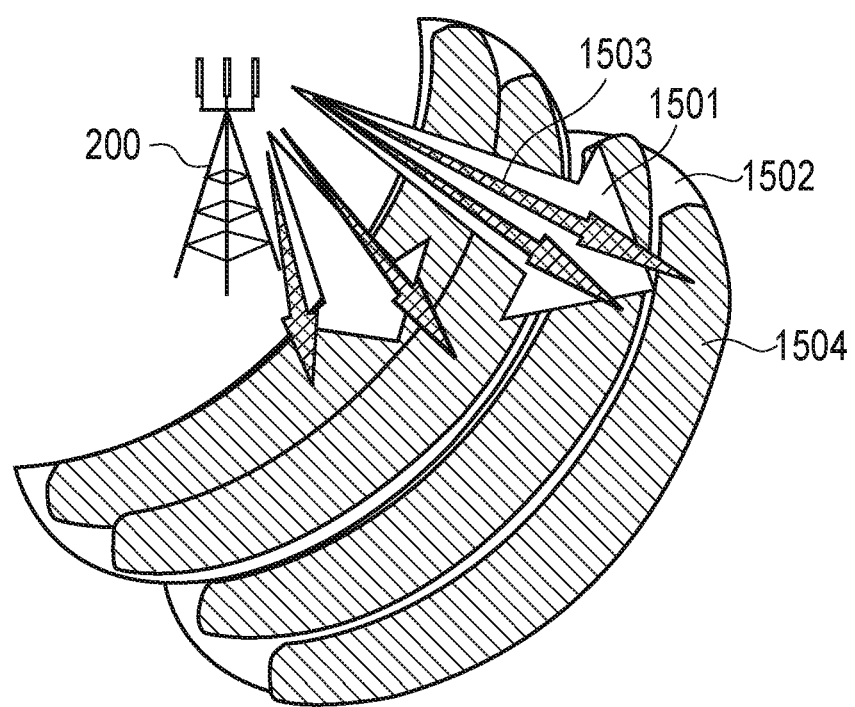
FIG. 15 is a view for describing an operation according to Additional Operation Example 2 of the first embodiment.

Additional Operation Example 2 of the first embodiment will be described with reference to FIG. 15 FIG. 15 is a view for describing an operation according to Additional Operation Example 2 of the first embodiment.

In FIG. 15, the eNB 200 transmits the precoded CSI-RS with directivities which can cover a cell range and have different degrees of subdivision (that is, different resolutions). In this manner, the eNB 200 may simultaneously form a plurality of directional beams with different resolutions.

In FIG. 15, a directivity 1501 is a directivity with a relatively small degree of subdivision and a wide width.

A coverage range 1502 is a coverage range formed by the directivity 1501 and covers a relatively wide range.

A directivity 1503 is a directivity with a relatively large degree of subdivision and a narrow width.

A coverage range 1504 is a coverage range formed by the directivity 1503 and covers a relatively narrow range.

The eNB 200 forms the cell range in which the coverage ranges with different sizes exist at the same time by simultaneously transmitting these directivities with different degrees of subdivision.

Alternatively, the eNB 200 may alternately form the coverage ranges with different sizes by alternately transmitting these directivities with different degrees of subdivision in a short time.

Alternatively, the directivities with different degrees of subdivision may be calculated in a pseudo manner on the UE 100 side.

The UE 100 calculates each CQI for the precoded CSI-RS with different degrees of subdivision and transmits (feeds back) the CQI to the eNB 200.

Incidentally, the UE 100 may transmit a difference between a CQI for a fine directivity with a high degree of subdivision and a CQI for a wide directivity of which coverage range overlaps with a coverage range formed by this fine directivity to the eNB 200. Alternatively, only the CQI with one directivity selected by the UE 100 may be transmitted.

Incidentally, the eNB 200 may transmit the precoded CSI-RS using a high resolution directivity that can cover the entire cell range. At this time, the UE 100 calculates directivities with different resolutions in a pseudo manner. In this case, the UE 100 calculates and feeds back each CQI for the high-resolution precoded CSI-RS. Alternatively, a more appropriate directivity may be calculated from CQIs obtained from a plurality of high-resolution precoded CSI-RSs and fed back as CQI information.

For example, when the normalized SINR (or received power or the like) is set as $\rho 1$ and $\rho 2$ for Directivity 1 and Directivity 2, respectively, such calculation is performed as follows.

Recommendation Directivity=$\rho 1$*Directivity
  1+$\rho 2$*Directivity 2       [Formula 1]

A result of such calculation may be fed back as CQI information.

In addition, when the directivity is expressed using an angle (tilting angle) in the vertical direction and an angle (direction angle) in the horizontal direction, the calculation may be performed as the following Formulas 2 and 3.

Recommendation Tilting Angle=$\rho 1$*Tilting Angle of
  Beam 1+$\rho 2$*Tilting Angle of Beam 2       [Formula 2]

Recommendation Direction Angle=$\rho 1$*Direction
  Angle Of Beam 1+$\rho 2$*Direction Angle Of
  Beam 2       [Formula 3]

The eNB 200 may select an appropriate directivity based on the CQI value, the amount of user data, the QoS, and the like and use the selected directivity for data transmission. At this time, when the UE 100 selects one directivity and only the CQI corresponding to this directivity is fed back, this directivity may be selected.

In addition, the eNB 200 may calculate a more appropriate directivity or an angle (tilting angle) in the vertical direction and an angle in the horizontal direction of the directivity from the CQI corresponding to each precoded CSI-RS fed back from the UE 100 to be used for transmission of user data. When the UE 100 calculates a directivity, the eNB 200 may generate a directivity according to the directivity.

Hereinafter, an example of determination on whether eNB 200 selects the directivity or generates a new directivity will be illustrated.

When the difference between the respective feedback CQIs corresponding to the precoded CSI-RSs is a predetermined value or larger (an index difference is one level or two or more levels in the case of the CQI index, or 5 dB or more in the case of SINR), the eNB 200 selects a directivity corresponding to the best CQI and uses the directivity for transmission of user data. Conversely, if the difference between the respective CQIs is less than the predetermined value, the directivity may be appropriately selected according to the agreement of eNB 100 (control policy as an operator) or a directivity may be newly calculated (Formulas 1 to 3 may be used as the calculation method).

In this manner, it is possible to selectively use the directivities with different resolutions and to realize flexible control. For example, when it is possible to use a relative coarse (wide) directivity, data is transmitted using the coarse directivity, thereby realizing high mobility performance. On the other hand, it is possible to improve communication in a coverage range where communication is difficult, with a high resolution beam although the mobility performance is sacrificed.

Second Embodiment

An operation according to a second embodiment will be described hereinafter.

Incidentally, there is a case where a part overlapping with the content that has been described in the above embodiment will not be described in the following description.

Figure 16:
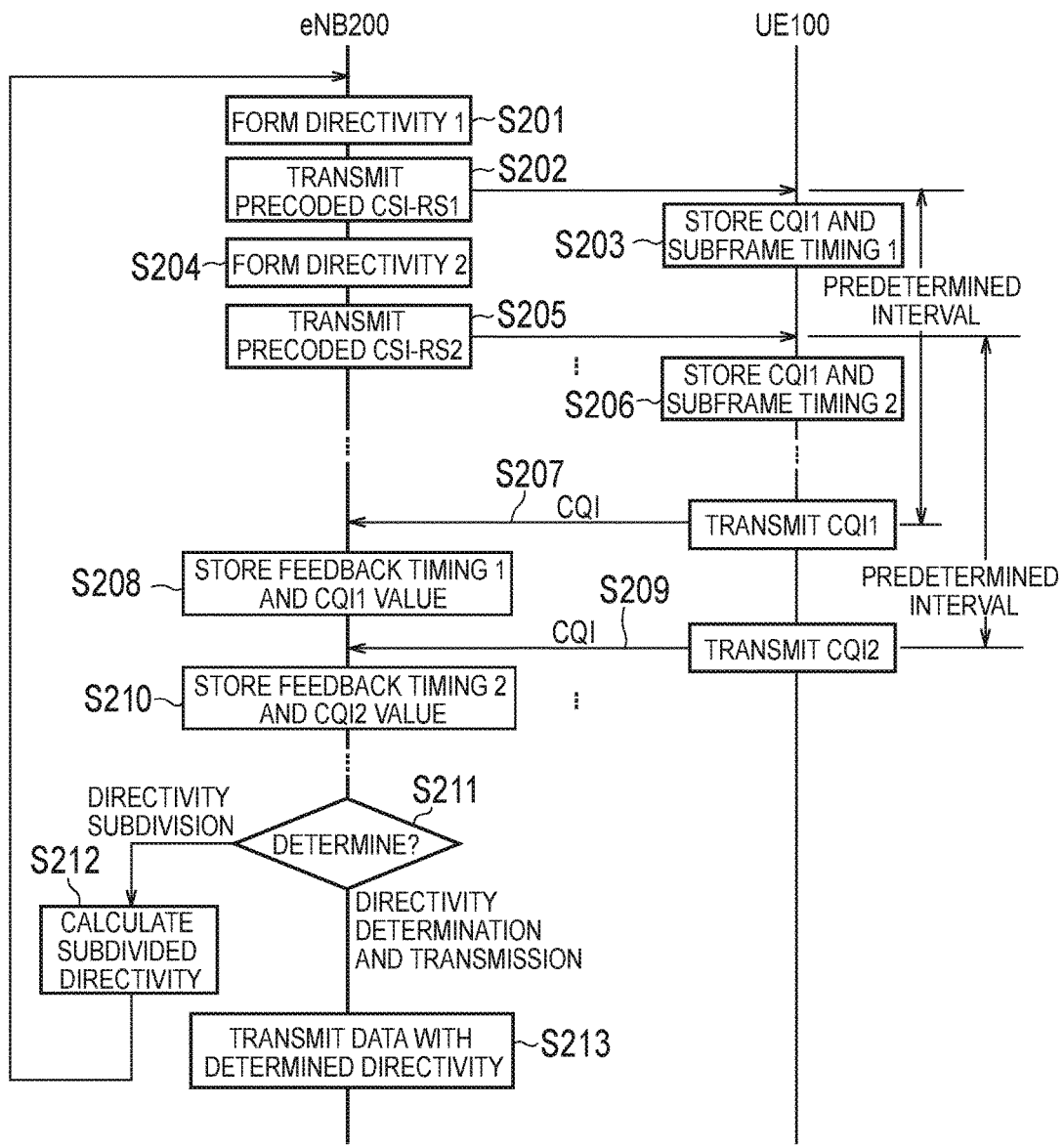
FIG. 16 is a view illustrating an operation sequence according to a second embodiment.

FIG. 16 is a view illustrating an operation sequence according to the second embodiment of the present embodiment.

In Step S201, the eNB 200 forms a first directivity in a certain downlink subframe.

In Step S202, the eNB 200 transmits the precoded CSI-RS1 which is a first precoded CSI-RS.

In Step S203, the UE 100 calculates the CQI1 when receiving the precoded CSI-RS1, and stores the CQI1 together with a received sub frame timing (a frame number or the like).

In Step S204, the eNB 200 forms a second directivity in a subsequent downlink subframe.

In Step S205, the eNB 200 transmits the precoded CSI-RS2.

In Step S206, when the UE 100 calculates a CQI2 when receiving the precoded CSI-RS2, and stores the CQI2 together with a received subframe timing.

In this manner, the eNB 200 forms N types of directivities and transmits up to the precoded CSI-RSn.

When the UE 100 has received the precoded CSI-RS1 in Step S203, the UE 100 transmits the CQI1 to the eNB 200 in an uplink subframe after a lapse of a predetermined subframe interval from the subframe in which the precoded CSI-RS1 has been received, in Step S207.

In Step S208, the eNB 200 stores a received subframe timing and the CQI1.

When the UE 100 has received the precoded CSI-RS2 in Step S206, the UE 100 transmits the CQI2 to the eNB 200 in an uplink subframe after a lapse of a predetermined subframe interval from the subframe in which the precoded CSI-RS2 has been received, in Step S209.

In this manner, the UE 100 transmits a CQIx to the eNB 200 after a lapse of the predetermined subframe interval from a slot where the precoded CSI-RSx has been received.

Incidentally, this predetermined subframe interval may be, for example, four subframes (the UE 100 performs transmission every four subframes from a subframe with reception).

In Step S210, the eNB 200 stores the received subframe timing and the CQI2.

In Step S211, the eNB 200 (the processor 240) understands the relationship between the precoded CSI-RS and the CQI from the stored subframe timing and CQI, and determines a directivity for the transmission to the UE 100.

Here, when a CQI is the predetermined quality or higher for a directivity with the highest CQI among selectable directivities, the eNB 200 selects this directivity. If the CQI is lower than the predetermined quality for the directivity with the highest CQI, the process proceeds to the process of subdividing the directivity.

When the subdivision of the directivity has been selected in Step S211, the eNB 200 calculates a subdivided directivity and applies the calculated directivity to the precoded CSI-RS in Step S212.

Thereafter, the eNB 200 returns to the process of Step S201 and transmits a new precoded CSI-RS.

In Step S213, when the directivity is determined in Step S211, the eNB 200 starts transmission of user data with the determined directivity.

When the transmission timing of the precoded CSI-RS from the eNB 200 and the reception timing of the UE 100 are set to have the predetermined interval in this manner, it is possible to grasp the relationship between the CQI and the directivity without using the beam ID.

Incidentally, the feedback is performed on the precoded CSI-RS received by the UE 100 in the above-described embodiments, but one precoded CSI-RS desired by the UE 100 may be selected to perform feedback only for this precoded CSI-RS.

Incidentally, a value to be fed back from the UE 100 is only the CQI in the above-described embodiments, but the value may also include an RI or a CSI.

Incidentally, the eNB 200 specifies the directivity without using the beam ID in the above-described embodiments. However, the directivity desired by the UE 100 may be indicated as the beam ID using the beam ID even when the UE 100 has performed the feedback for the plurality of precoded CSI-RSs. Accordingly, it is possible to reduce the steps required for determination of the directivity by the eNB 200 in some cases. This beam ID may be obtained by extension of a measurement report of the existing LTE specification from the UE 100.

Incidentally, the predetermined number of subframes has been set in advance in the above-described embodiments, but the eNB 200 may teach a configuration for feedback of the beam ID in advance for the UE 100. Accordingly, for example, the eNB 200 can inform the UE 100, in advance, that "the feedback is performed after four subframes".

Other Embodiments

When the radio transceiver 210 of the eNB 200 forms a directivity, the directivity may be formed by performing weighting on each of the plurality of antenna elements forming the antennas 201 in the above-described embodiments. For example, an adaptive antenna system can be applied. In addition, the antenna 201 may be configured using a plurality of antenna elements each of which has the directivity.

In the above-described embodiments, the information fed back by the UE 100 may be transmitted in the state of being included in the measurement report, and the eNB 200 may receive and use this information.

In the above-described embodiments, the measurement configuration and report may include any information indicating the beam ID, or a CSI-RS resource position (the RB, the subframe, or the like).

Appendix (1. Beamformed CSI-RS)

The main motivation for beamformed CSI RS can be deemed as achieving more accurate link adaption than un beamformed CSI RS schemes, since the same beam can be actually used for data transmission. Based on this motivation, beamformed CSI RS enhancement schemes are preferred.

In particular, the appendix proposed specific beamformed CSI RS schemes. In this section it focuses on one of the beamformed CSI RS schemes called beam selection.

Using beam selection scheme, the eNB transmits beamformed CSI RSs (called candidate beams), and the UE provides a feedback consisting of the preferred beam index (es) based on pre-defined criterion(s). Based on this feedback the eNB precodes and transmits the data to the UE.

This appendix also evaluated the performance of the beam selection scheme.

According to the evaluation results, the following was observed:

Observation 1: A relative large number of beams, e.g., larger than 4 in vertical dimension, is necessary for beam selection CSI-RS enhancement scheme to achieve required performance.

On the other hand, it has been agreed that Max(M*N)=32. Thus, it is natural to avoid generating excessive number of beams simultaneously. Furthermore, pointed out from the overhead perspective, the beam selection scheme requires larger CSI RS overhead than that of the separate vertical and horizontal PMI based feedback scheme.

Observation 2: Beam selection scheme needs larger CSI-RS overhead compared to separate vertical and horizontal PMI based feedback scheme.

(2. Dynamic Beamformed CSI-RS)

Based on the beam selection CSI RS enhancement scheme, it proposes to use a so called dynamic beamformed CSI RS scheme. The dynamic beamformed CSI RS has the same concept as the beam selection scheme; however, the resolution of the candidate beams are dynamically adjusted according to some pre defined criterion(s) as illustrated in FIG. 17.

As shown in FIG. 17, in the dynamic beamformed CSI RS scheme, the eNB initially transmits relative low resolution CSI RS beams to cover the whole cell area. The UE feeds back the required CSI information (Beam ID, CQI, RI and/or other information if necessary) to the eNB.

Based on the feedback information and pre defined criterion(s), which usually could be the CQI level and the beam generating capability of the eNB, the serving eNB decides either to start transmitting data using the current beam reported back by the UE (i.e., the relative low resolution beam) or transmit a set of narrower CSI RS beams (i.e., higher resolution CS! RS beams) to search for better transmission beam(s). For the latter case, the serving eNB also can start the data transmission by using the current beam and then transmit narrowed CSI RS beams and the UE further reports required CSI information to the eNB to explore better transmission beam(s).

Such a dynamic beamformed CSI RS scheme can reduce the overhead and meanwhile maintain a comparable performance to the beam selection scheme mentioned in section 2 and reduce the processing burden of the eNB compared to schemes that generate large number of high resolution CSI RS beams only.

Proposal: Dynamic beamformed CSI RS enhancement schemes should be considered to reduce the overhead.

Conclusions

In this appendix, the beam selection scheme proposed by appendix is reviewed.

Cross Reference

The entire content of U.S. provisional application No. 62/145,726 (filed on Apr. 10, 2015) is incorporated in the present specification by reference.

INDUSTRIAL APPLICABILITY

The present invention is useful in the field of communication.

The invention claimed is:

1. A mobile communication system configured to perform communication between a base station and a user terminal, wherein
when a directivity is formed to transmit a radio signal, the base station transmits a first radio signal including identification information to identify the formed directivity and a reference signal,
the user terminal receives the first radio signal and transmits a second radio signal including quality information when receiving the reference signal and the identification information,
the base station receives the second radio signal and determines the directivity to be formed based on the identification information and the quality information, and
the base station detects mobility of the user terminal based on the second radio signal received from the user terminal or information included in the second radio signal, and determines a directivity wider than the directivity to be formed when the mobility indicates a predetermined movement amount per unit time or a movement amount greater than the predetermined movement amount.

2. The mobile communication system according to claim 1, wherein
the base station determines the directivity to be formed as a directivity with a higher resolution when quality indicated by the quality information is lower than predetermined quality.

3. The mobile communication system according to claim 2, wherein
when the directivity to be formed is divided to a directivity with a predetermined directivity resolution, the base station determines the corresponding directivity.

4. The mobile communication system according to claim 1, wherein
the base station transmits the reference signal even after determining the directivity to be formed that is used for data transmission.

5. The mobile communication system according to claim 1, wherein the base station stops transmission of the reference signal after determining the directivity to be formed.

6. The mobile communication system according to claim 1, wherein
the base station has a plurality of antenna ports,
the base station and the user terminal have a common codebook defining a weight when performing weighting on a signal for each of the antenna ports,
when the directivity becomes narrower than a predetermined directivity, the base station performs weighting according to the codebook for each of the antenna ports,
the user terminal transmits a signal including information of a specific precoding matrix selected from the codebook based on a signal obtained when receiving the reference signal, and
the base station receives the signal transmitted from the user terminal and determines weighting for each of the antenna ports based on the precoding matrix included in the signal.

7. The mobile communication system according to claim 1, wherein
the user terminal transmits the quality information and the identification information to the base station for a single directivity or a plurality of directivities with relatively high communication quality.

8. A mobile communication system to perform communication between a base station and a user terminal, wherein
the base station transmits a first radio signal including a reference signal at a predetermined timing according to a formed directivity,
the user terminal transmits a second radio signal including communication quality information when receiving the reference signal after a lapse of a predetermined period from the reception of the first radio signal,
the base station receives the second radio signal and determines a directivity to be formed based on the timing at which the user terminal transmits the second radio signal and the quality information, and
the base station detects mobility of the user terminal based on the second radio signal received from the user terminal or information included in the second radio signal, and determines a directivity wider than the directivity to be formed when the mobility indicates a predetermined movement amount per unit time or a movement amount greater than the predetermined movement amount.

9. A base station to perform communication with a user terminal, the base station comprising:
a transceiver configured to transmit and receive a radio signal;
a formation unit configured to form a directivity of the radio signal to be transmitted by the transceiver; and
a controller configured to determine the directivity to be formed by the formation unit, wherein
the transceiver transmits a first radio signal including identification information to identify a directivity and a reference signal with the directivity formed by the formation unit, and receives a second radio signal transmitted by the user terminal,
the controller determines the directivity to be formed by the formation unit based on the identification information and quality information based on the reference signal transmitted by the base station which are included in the second radio signal transmitted by the user terminal, and
the controller detects mobility of the user terminal based on the second radio signal transmitted by the user terminal or information included in the second radio signal, and determines a directivity wider than the directivity to be formed when the mobility indicates a predetermined movement amount per unit time or a movement amount greater than the predetermined movement amount.

* * * * *